United States Patent [19]

Brooks

[11] 4,390,578
[45] Jun. 28, 1983

[54] METHOD OF JOINING MEMBERS

[75] Inventor: Douglas H. M. Brooks, Crowborough, England

[73] Assignee: Blacknell Buildings Limited, Farnborough, England

[21] Appl. No.: 239,193

[22] Filed: Mar. 2, 1981

[30] Foreign Application Priority Data

Mar. 13, 1980 [GB] United Kingdom ............... 8008605

[51] Int. Cl.³ .................... B32B 3/00; B29C 19/00
[52] U.S. Cl. ........................................ 428/57; 49/504;
49/506; 52/309.3; 52/309.15; 52/782; 144/347;
144/348; 156/182; 156/294; 156/304.5;
156/304.6; 156/309.6; 156/309.9; 156/322;
156/324.4; 403/267; 403/270; 403/401; 428/53;
428/60
[58] Field of Search ............... 156/182, 309.9, 294,
156/322, 309.6, 324.4, 304.5, 304.6; 428/53, 60,
57; 403/267, 401, 270; 52/309.3, 782, 309.15;
49/504, 506, 816.2; 144/309 L, 309 M

[56] References Cited

U.S. PATENT DOCUMENTS

| 2,392,734 | 1/1946 | Haberstrump | 156/306.6 |
| 2,503,882 | 4/1950 | Medford | 156/304.6 |
| 3,855,038 | 12/1974 | Anschutz | 156/304.6 |
| 3,928,100 | 12/1975 | Heuschen et al. | 156/304.5 |

FOREIGN PATENT DOCUMENTS 1443953 7/1976 United Kingdom ............... 403/401

Primary Examiner—John J. Gallagher
Attorney, Agent, or Firm—McCormick, Paulding & Huber

[57] ABSTRACT

Two members 2, each located in a heat sealable sheath 4, are joined together to form a right-angle joint. Two plates 8 of heat sealable material are attached to the associated ends 6 of the members 2 by means of dowels 10 inserted into holes 12 in the member ends. The outer surface 14 of each plate 8 is flush with its associated sheath end 4. The mounted plates 8 are hot-plate welded and then pressed together with the ends of the sheaths 4 to form the joint. The plates 8 provide additional strength to the joint.

10 Claims, 8 Drawing Figures

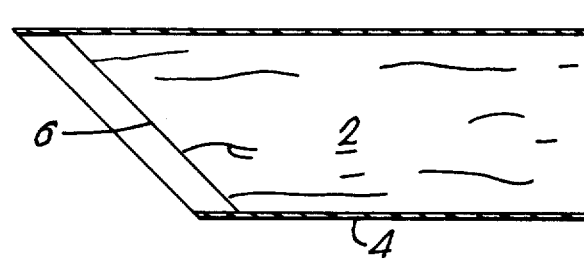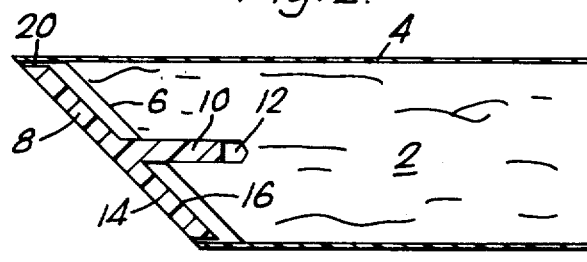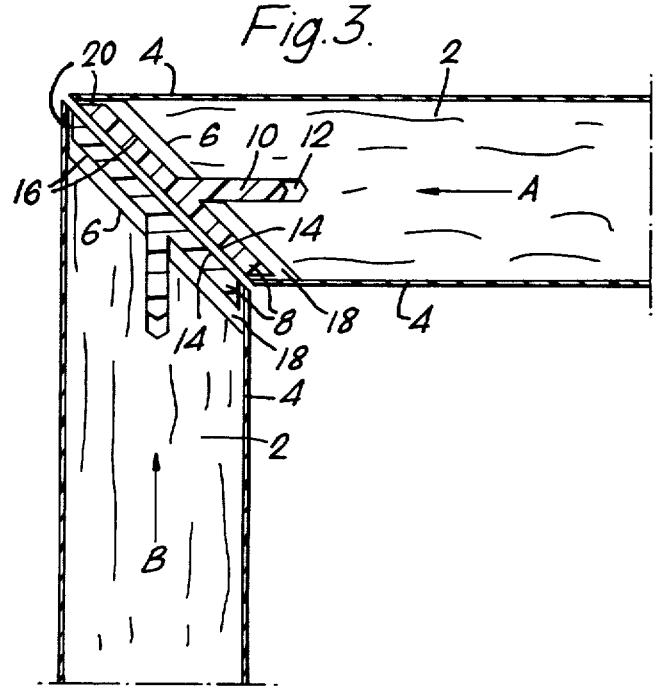

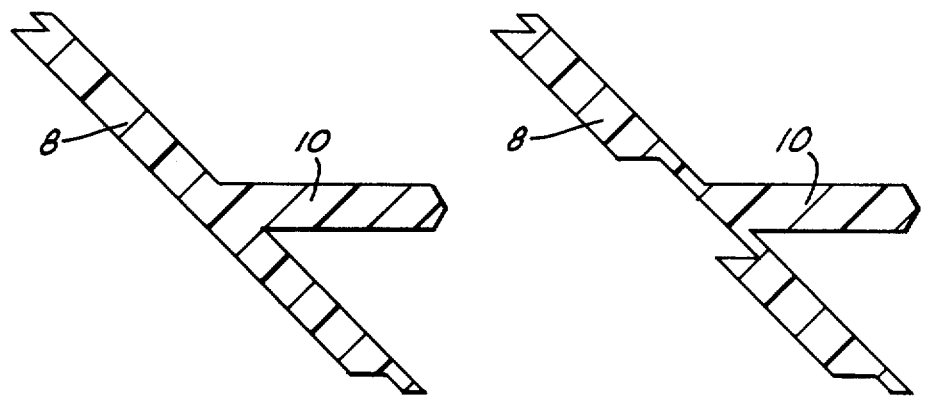
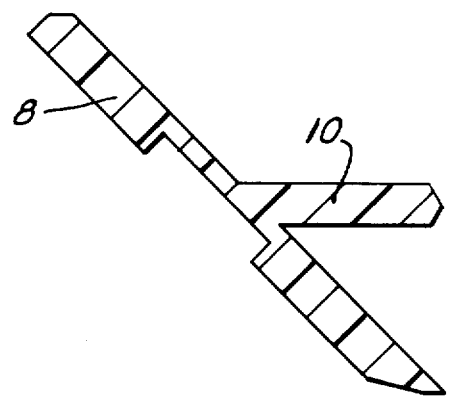
Fig. 4.
Fig. 5.
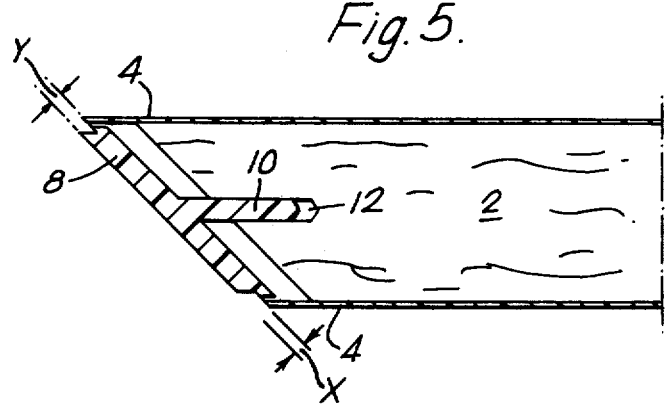

METHOD OF JOINING MEMBERS

TECHNICAL FIELD

The present invention relates to a method of joining two members in which each member is located in a heat sealable sheath which extends beyond the end to be joined.

The invention is particularly concerned with a method of joining elongate wooden members to form a frame for a window or door. Each member is housed in a sheath of thermoplastics material which extends beyond the end to be joined with the wooden members providing the strength for the frame, and the plastics sheath providing an attractive appearance and a serviceable surface.

BACKGROUND ART

One method of joining two frame members is to cut the member end at 45° to the longitudinal axis of the member, heat the extended ends of the member sheaths until they melt, and then to press the member ends together and to retain the member ends pressed together while the sheath ends cool and solidify to effect the joint.

With this known method the problem arises that the strength of the joint has to be provided by the relatively thin plastics sheaths.

STATEMENT OF INVENTION AND ADVANTAGES

It is an aim of the invention to alleviate this disadvantage, and according to one aspect of the invention there is provided a method of joining two members, each located in a heat sealable sheath extending beyond the end to be joined; said method comprising attaching a plate of heat sealable material to each of the two member surfaces to be joined, at least partly melting the two plates, pressing together the two melted plates, and retaining the two plates pressed together until the plates have cooled and solidified to effect the joint.

Preferably the members are wooden and dimensioned so that they may form a frame for a window or door when joined together. The heat sealable material of the sheaths and plates may be a plastics material such as for example polyvinyl-chloride. On melting the plates, excess material flows from the melted portion of the plates to fuse with the two sheaths surrounding the joined member ends so as to provide a continuous mass of plastics material at the joint constituting the ends of the sheaths and the contacting portions of the plates. In consequence, the plates provide joined contacting surfaces across substantially the entire cross sectional area of the two joined members. In order to increase the strength of the joint, it is preferable for the plates to be thicker than the sheaths which also provide weatherproofing.

One method of securing a plate to its respective member comprises securing a dowel or peg to a central portion of the plate to extend therefrom and forming a hole in the corresponding portion of the member end. The dowel and hole are dimensioned so that the dowel makes a tight fit in the hole and leaves a recess at the end of the hole when the plate is in a correct position relative to the sheath end. A suitable adhesive is located in the hole before the dowel is inserted, and excessive adhesive can escape from the hole along longitudinal grooves in the dowel.

A suitable method of heating the plates is by the process of hot-plate or mirror plate welding. In this process the plate surfaces to be welded are heated by the radiation of an electrically heated plate which is withdrawn prior to the welded surfaces being pressed together.

It is to be understood that a method of the invention is applicable to members, sheaths and plates of any suitable material. For example, the members could be made of metal such as for example extruded aluminium, and thermoplastics and thermosetting, filled or unfilled plastics material. In addition to polyvinyl chloride the sheaths and plates can be made of materials such as for example combinations of laminated material such as ABS, acrylic plastics and polyvinyl chloride co-polymers or hybrids of polyvinyl chloride with other plastics materials.

According to another aspect of the invention there is provided an assembly comprising two members, each located in a heat sealable sheath, joined by the aforementioned method.

FIGURES IN THE DRAWINGS

An embodiment of a method of joining two members in accordance with the present invention will now be described by way of example only with reference to the accompanying illustrative diagrammatic drawings in which:

FIG. 1 is a side elevation of one sheathed member to be joined;

FIG. 2 is a side elevation of the member of FIG. 1 with a plastics plate attached;

FIG. 3 is a perspective view from above of two members about to be joined;

FIG. 4 is a side elevation of three different plates;

FIG. 5 is a side elevation similar to FIG. 2 with a different shaped plate;

DETAILED DESCRIPTION OF DRAWINGS

Figure 6:
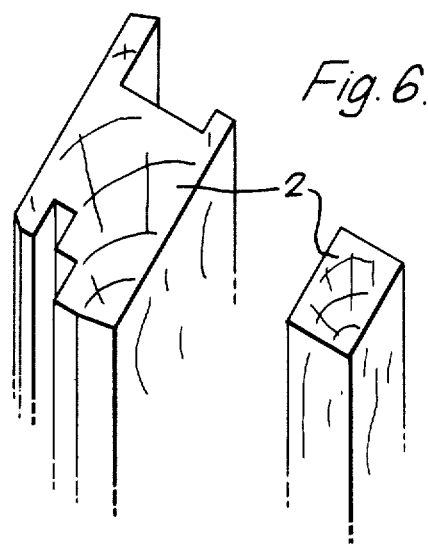
FIG. 6 is a perspective view of two different shaped members.
Figure 7:
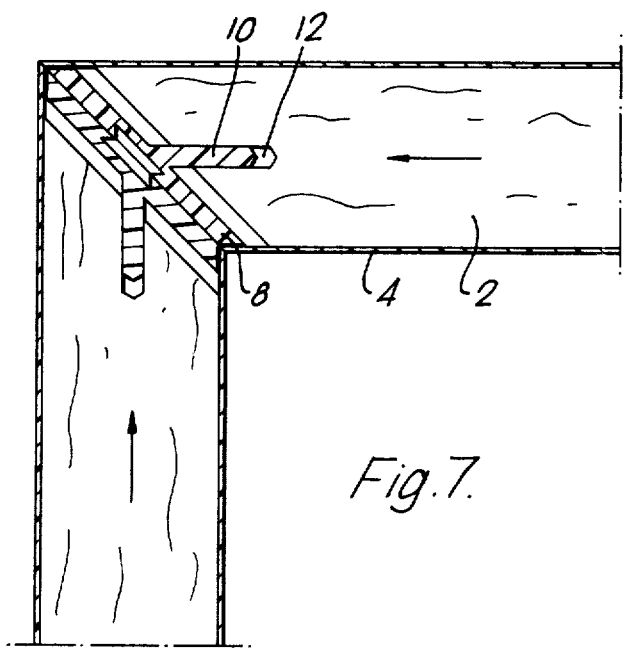
FIG. 7 is a perspective view from above of two joined members of the invention.
Figure 8:
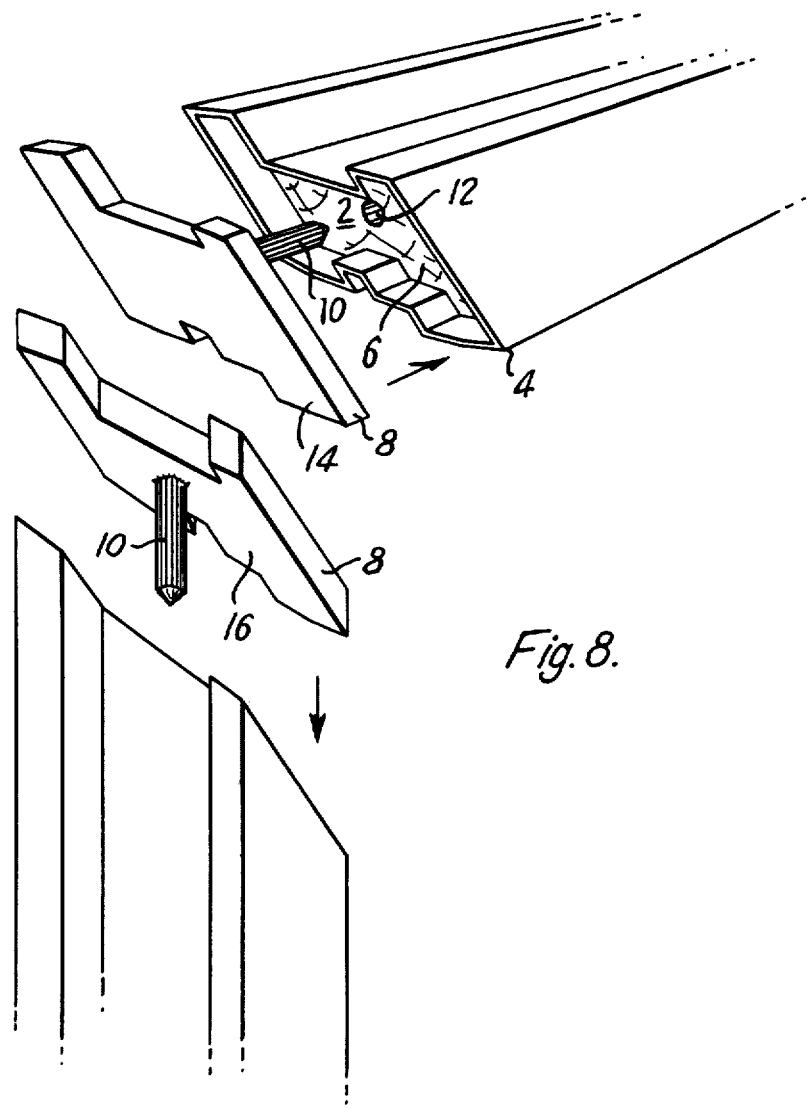
FIG. 8 is an exploded perspective view of a joint of the invention.

Referring to FIGS. 1 and 2, an elongate wooden frame member 2 is encased in a polyvinyl chloride tubular sheath 4 which extends beyond the member end 6 to be joined. This member end 6 is angled at 45° to the longitudinal axis of the member 2.

Referring particularly to FIG. 2, a plate 8 of polyvinyl chloride has a dowel 10 extending from its central portion. This dowel 10 is dimensioned to make a firm fit in a tubular hole 12 extending into the central portion of the member end 6. The aforementioned components are dimensioned so that when the plate outer surface 14 is flush with the projecting ends of the sheath 4, there is a tolerance gap in the range from 4 to 6 millimeters between the plate inner surface 16 and the member end 6, and the ends of the dowel 10 and the hole 12. This gap is provided to allow for and contain the adhesive cement to secure the plate 8 to the member 2 and to provide a tolerance for the correct positioning of the plate end 14 relative to the end of the sheath 4.

This cement is placed in the hole 12 before inserting the dowel 10. To allow the excess cement to escape from the hole 12 on insertion of the dowel, circumferentially spaced longitudinal grooves extend along the outer surface of the dowel 10. The excess cement is directed into the spaces 18 and 20 between the plate 8 and the member 2, and the plate 8 and the projecting portion of the sheath 4 thereby ensuring the firm adhesion of these members to one another. Only one dowel 10 is used to enable the plate 8 to be rotated slightly to ensure that this plate 8 is correctly positioned.

With the plate 8 firmly located in position to an accuracy of + or −0.5 millimeters in a direction parallel to the longitudinal axis of the member 2, the assembly is ready for welding to a similar component as illustrated in FIG. 3. The weld is carried out by the process of hot-plate welding which is also known as mirror plate welding. In this process, a hot metal plate is placed in light contact between the outer surfaces 14 of the plates 8 to be welded together. When the surfaces 14 have become sufficiently pliable the welding plate is withdrawn and the two members 2 are moved together in the direction of the arrows A and B to press together the outer surfaces 14 of the two plates 8 together with the ends of the sheaths 4. These surfaces 14 are held pressed together until the material of the plates 8 and the ends of the sheaths 4 has cooled and solidified to effect a firm joint between the two members 2. The specific duration of each part of the operation and the pressure required to form the weld are derived by experiment and are dependent upon the nature of the plastics material to be welded and the dimensions and shape of the components. However, the overall cycle time is of the order of from 1 to 2 minutes.

In the aforementioned arrangement, a secure joint would be achieved between the entire outer surfaces 14 and the ends of the plastics sheaths 4 but the joined sheath ends would distort outwardly at their line of joining to form an outwardly extending rim around the line of joining. In order to reduce this distortion, the plate 8 may be modified in shape as illustrated in FIG. 4.

It may also be necessary to vary the distance of the insertion of the plate 8 into the outer sheath 4 as illustrated in FIG. 5. The variation in this insertion distance is indicated at the points XY in FIG. 5. The purpose of varying this distance is to regulate the degree of welding that takes place between the two plates 8 before the sheaths 4 contact one another and commence to weld. The combination of the shape of the plates 8 and the insertion variation XY will determine the final configuration of the weld line, the degree of distortion and the general efficiency of the joint. In addition, the shape of the plates 8 and the dimension XY will be dependent on the type of plastics material employed, and the cross sectional shape of the members 2. Examples of such cross sections of the members 2 are illustrated in FIG. 6.

The distortion of the weld line may be reduced by encasing or partly encasing the end portion of each sheath 4 to be joined with a steel tool during the welding operation.

In the previously described embodiment the adhesive cement may be omitted and the plate 8 may be held on the member 2 with sufficient strength by suitably choosing the dimensions of the dowel 10 relative to the dimensions of the tubular hole 12. In an alternative arrangement the dowel 10 may be omitted and the plate 8 may be attached to the member 2 by means of a screw or similar device.

I claim:

1. A method of joining the proximate ends of two members, each having a heat sealable sheath projecting from the end of the member to be joined; said method comprising attaching two plates of heat sealable material respectively to the ends of the two members to be joined with the heat sealable sheaths projecting from the members into adjacent relationship with the respective plates, at least partly melting the two plates with heat, allowing the melted plates and the adjacent heat sealable sheaths to fuse together and encase the two members respectively and individually in a continuous mass of heat sealable material at the proximate ends, also pressing together the two melted plates, and retaining the two plates pressed together until the plates have cooled and solidified to effect a joint holding the members together and sealing the members individually within the respective sheaths.

2. A method as claimed claim 1, in which the plates are melted and pressed together in a hot-plate or mirror plate welding process.

3. A method as claimed in claim 1, in which each plate is attached to its associated member by locating a dowel at a central portion of the plate to extend therefrom, forming a hole in the corresponding portion of the member end such that the dowel fits in the hole, and securing the dowel in the hole.

4. A method as claimed in claim 3, including dimensioning the dowel and the hole to leave a recess at the end of the hole, and locating adhesive in the recess before the dowel is inserted.

5. A method as claimed in claim 3, in which the dowel and the hole are dimensioned to retain each plate on its associated member without adhesive.

6. An assembly comprising two members, each having a heat sealable sheath, joined by the method as claimed in claim 1.

7. An assembly as claimed in claim 6, in which the two members are wooden.

8. An assembly as claimed in claim 6, in which the two members are made of metal.

9. An assembly as claimed in claim 6, in which the sheaths and the plates are made of a thermoplastics material.

10. An assembly as claimed in claim 6, in which the two members are made of plastic material.

* * * * *